April 18, 1933.　　　N. SKILLMAN　　　1,904,769
SHAFT MOUNTING
Filed Oct. 18, 1926
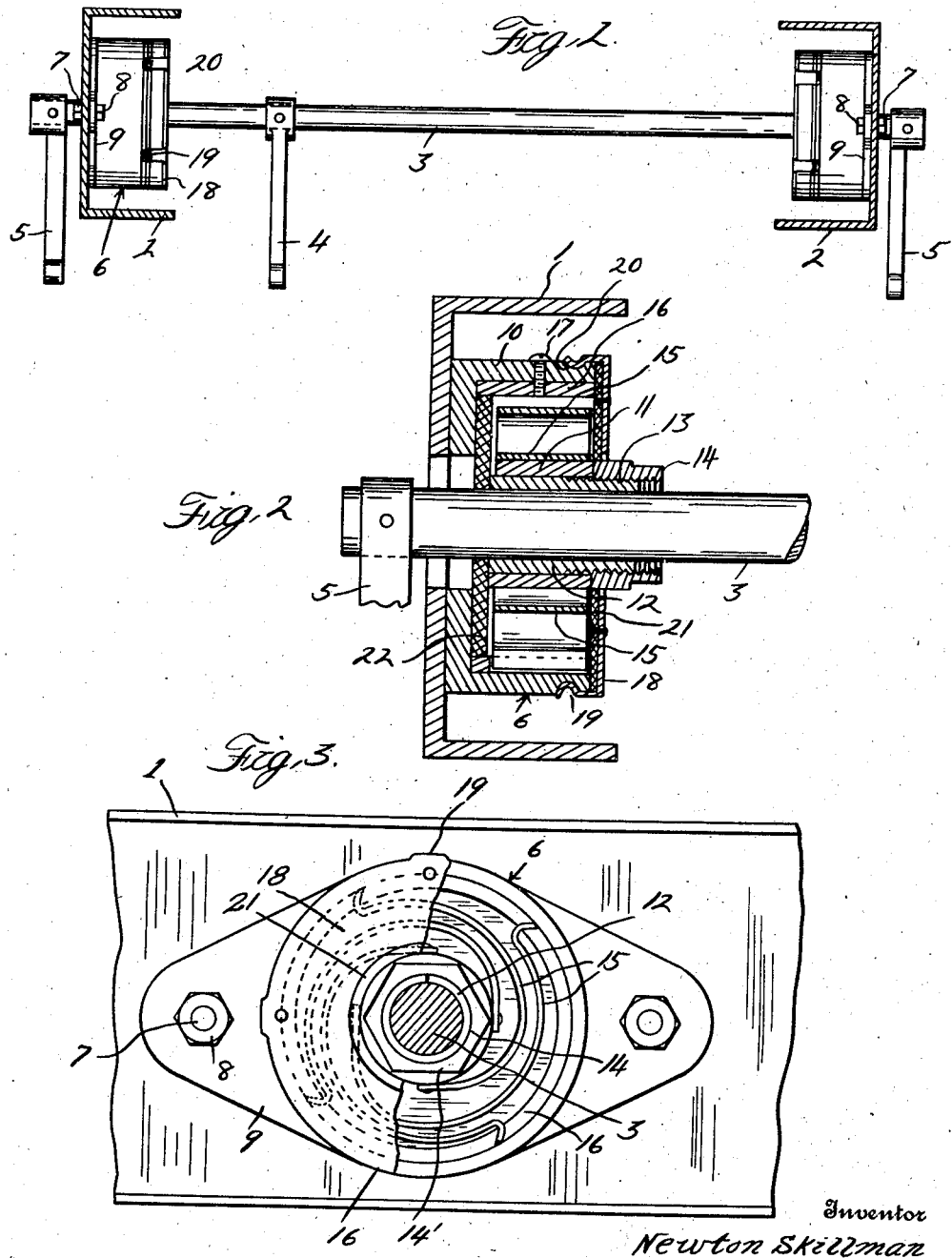
Inventor
Newton Skillman Patented Apr. 18, 1933

1,904,769

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

SHAFT MOUNTING

Application filed October 18, 1926. Serial No. 142,430.

The invention relates to shaft mountings and is particularly applicable to mountings for rotary shafts of motor vehicles. One of the objects of the invention is to provide means for mounting rotary cross shafts such as brake shafts upon the motor vehicle chassis frames providing for manufacturing inaccuracies in the locations of the mounting supports without interfering with the rotary movements or oscillations of the shafts. Other objects are to provide self-aligning mountings; to provide mountings which resiliently hold the shafts in predetermined positions relative to the supports; and to provide mountings having non-metallic contact between the relatively movable parts. Further objects of the invention reside in the novel features of construction and combinations and arrangements of parts as more fully hereinafter set forth.

In the drawing:—

Figure 1 is a cross section through a motor vehicle chassis frame showing the method of mounting an oscillatory cross brake shaft;

Figure 2 is an enlarged section of a portion thereof;

Figure 3 is an end view, partly in section.

The chassis frame of the motor vehicle has the side sills 1 and 2 which, as shown in the present instance, are channel-shaped. The webs of these side sills are apertured for the passage of the oscillatory cross brake shaft 3 which has secured thereto intermediate the side sills the arm 4 for connection to the brake pedal. This shaft may also have secured to its ends and outside the side sills the arms 5 for connection to the brake shoes of either the front or rear wheels. Owing to manufacturing inaccuracies, the apertures in the side sills may be misaligned and to allow for the misalignment and at the same time provide for proper oscillation of the shaft I have devised the following means for mounting the shaft.

This means comprises similar mountings at each end of the shaft, one of which will be described in detail. 6 is the support of the mounting in the nature of a bracket secured to the inner side of the web of a side sill as by means of the bolts 7 and nuts 8, the former extending through the web of the side sill and the flanges 9 upon the support. The support has the inwardly extending cylindrical flange 10 within which is located the hub 11. The shaft 3 extends through the support and the hub and is fixedly secured to the latter by suitable means such as the tapered split bushing 12 having threads 13 at its inner end which are engaged by the nut 14 which is adapted to abut the inner end of the hub and which upon tightening moves the bushing longitudinally inward relative to the hub and clamps the same firmly upon the shaft. 15 are spirally arranged springs between the hub and the support and providing for rotative and universal movement through relatively great ranges of the shaft relative to the support.

The springs 15 are rigidly secured at their inner ends to the hub 11 and at their outer ends to the diametrically opposite side of the sleeve 16, which latter is insertable within the cylindrical flange 10 of the support and is suitably fixedly secured thereto as by means of the screws 17. The arrangement is such that the hub, the springs and the sleeve may form a unit and be readily attached to the shaft and the support.

For closing the inner open end of the cylindrical flange 10, I have provided the sheet metal cap 18 having a central opening providing for the passage of the shaft 3 and the nut 14. This cap may be secured to the cylindrical flange as by means of the resilient tongues 19 upon the cap having curved ends engageable in the annular groove 20 formed in the outer face of the cylindrical flange 10. 21 is a fibrous packing fixedly secured to the cap and adapted to be clamped against the edge of the cylindrical flange 10, this packing also having a central opening therethrough providing for a close fit of the cylindrical portion 14' of the nut 14 therewith. 22 is another fibrous packing within the cylindrical flange 10 and having a central opening for the passage of the shaft 3 providing for a close fit of the shaft with the packing. These two packings, it will be seen, are at opposite ends of the hub and springs and together form a seal for protecting the parts within the cylindrical flange of the support from moisture.

In operation the supports at the opposite ends of the shafts may be out of alignment but the hubs within these supports are self-aligning and consequently the operation of the brake shaft is not interfered with. By reason of the spiral springs the brake shaft may be rocked in applying the brakes and will be returned to its normal rotative position by the action of the springs themselves. It will be further seen that with this construction the relatively movable parts have no metallic contact and lubrication is consequently unnecessary.

What I claim as my invention is:

1. The combination with a rotary cross shaft for vehicle frames, of a mounting for each end of said shaft comprising a cylindrical housing radially spaced from the shaft, and resilient means upon said shaft and serving as the sole means for carrying said shaft, said resilient means being connected at one end to the inside of said housing and providing for rotative and universal movements through relatively great ranges of said shaft relative to said housing and normally retaining said shaft in a predetermined lateral and rotative position relative to said housing.

2. The combination with a rotary cross brake shaft for vehicle frames, of a mounting for each end of said shaft comprising an annular housing radially spaced from the shaft, a hub carried by each housing and fixedly carrying said shaft, and means between each housing and hub yieldably supporting and spacing the latter from the former and providing universal and rotative movement through a relatively great range of the latter relative to the former.

3. The combination with a rotary cross brake shaft for vehicle frames, of a mounting for each end of said shaft comprising an annular housing radially spaced from the shaft, and a plurality of spiral springs connected at their opposite ends to said housing and shaft at spaced points and providing for rotative and universal movements of said shaft relative to said housing.

4. The combination with a rotary cross brake shaft for vehicle frames, of a mounting for each end of said shaft comprising an annular housing and sleeve spaced from the shaft, a hub fixedly carrying said shaft and spiral springs between said sleeve and hub and providing for rotative and universal movements of said shaft relative to said sleeve and housing.

5. The combination with a rotary cross brake shaft for vehicle frames, of a mounting for each end of said shaft comprising supporting housings into which said shaft extends, said housing being radially spaced from the shaft, and a plurality of spiral springs within said housing and spaced circumferentially around said shaft and connected at their ends to said housing and shaft for directly supporting said shaft, said springs providing for rotative and universal movements of said shaft relative to said housings and frame.

6. The combination with a rotary shaft, of a mounting for each end of said shaft comprising supporting housings into which said shaft extends, a hub within each housing, means for fixedly securing said shaft to said hubs, spiral springs within each housing and connected at their ends to said housing and hub for freely supporting the shaft in each housing, said springs providing for rotative and universal movements of said shaft relative to said housing, and fibrous packing at the ends of said hub and edges of said springs.

7. The combination with a rotary cross brake shaft for vehicle frames, of a mounting for each end of said shaft comprising supporting housings, a sleeve within each housing and secured thereto, a hub within and spaced radially from said sleeve, means for fixedly securing said hub to said shaft to oscillate therewith, and means between said sleeve and hub yieldably carrying each end of said shaft and providing for rotative and universal movements of said shaft relative to said sleeve and frame.

8. In a chassis frame having a cross brake shaft therefor, housings at each end of the shaft carried by said frame, said housings being radially spaced from the shaft, and springs secured at one end to said shaft and rotatable therewith and secured at the other end to the interior surface of said housings, said springs positioning each end of the shaft free of the housings whereby to provide a universal mounting and said springs also allowing for oscillation of said shaft by tending to return the same to normal position.

In testimony whereof I affix my signature.

NEWTON SKILLMAN.